June 25, 1929.     J. C. GIPE     1,718,347
GRINDING HEAD
Filed July 2, 1925
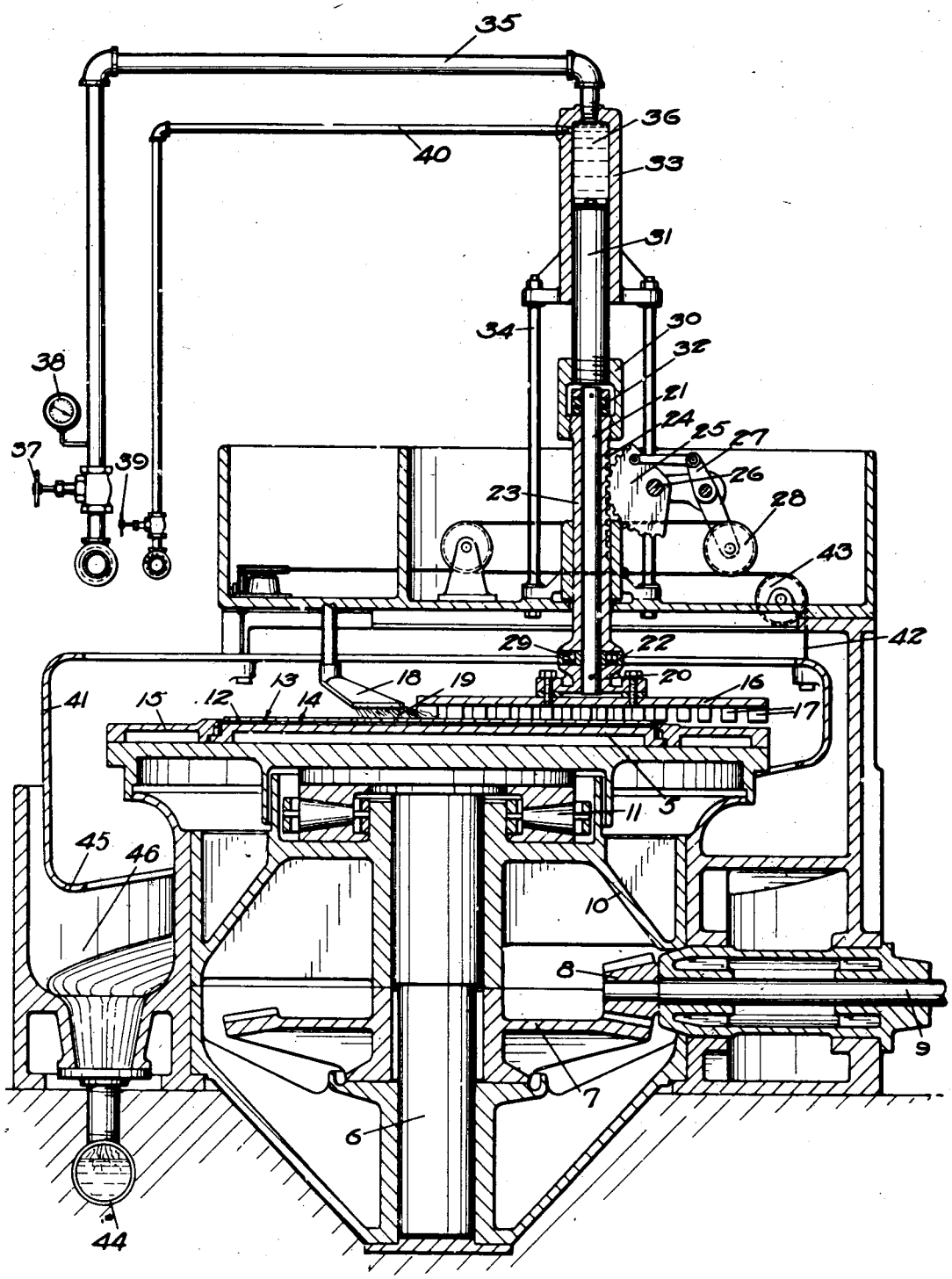
INVENTOR.
John C. Gipe.
Frank Fraser
ATTORNEY.

Patented June 25, 1929.

1,718,347

UNITED STATES PATENT OFFICE.

JOHN C. GIPE, OF TOLEDO, OHIO, ASSIGNOR TO THE LIBBEY-OWENS SHEET GLASS COMPANY, OF TOLEDO, OHIO, A CORPORATION OF OHIO.

GRINDING HEAD.

Application filed July 2, 1925. Serial No. 41,039.

The present invention relates to sheet glass surfacing apparatus and has particular reference to an improved form of grinding head.

An important object of the invention is to provide a grinding head especially well-adapted for use in the production of plate glass, the grinding head being so constructed that any amount of pressure can be applied thereto.

Another object of the invention is to provide a grinding head for producing plate glass wherein the pressure of the grinding head upon the sheet of glass being surfaced can be controlled to facilitate a rapid surface of the glass.

Still another object of the invention is to provide a grinding head of this nature wherein pressure may be increased upon the end of the grinding head as the head wears off during use, thus permitting a sheet of glass to be surfaced as rapidly after the head has become substantially worn as when the head is new.

Other objects and advantages of the invention will become apparent during the course of the following description.

The drawing is a vertical longitudinal section through a grinding machine showing my improved grinding head in use.

In the surfacing of glass to produce plate glass, a sheet of glass is supported upon a suitable rotatable table, and a grinding head is arranged above the sheet, the axis of the grinding head being usually offset from the axis of the sheet supporting table. Ordinarily the grinding head is not positively driven, being rotated by reason of its contact with the rotatable sheet. Some form of abrasive is supplied to the sheet, the abrasive action taking place between the grinding head and the sheet. As glass is a relatively hard substance, a hard abrasive is used for the surfacing operations, and obviously the abrasive action is equally effective on the grinding head as upon the sheet of glass itself. In the particular construction shown in the drawings a metallic head is used, being preferably formed from cast iron, although any type of metal may be used. In actual use the cast iron heads which weigh in the neighborhood of one thousand pounds become worn down so that the weight thereof is considerably less after a period of use than when the head is first installed. The speed at which the sheet is surfaced depends to a great extent upon the pressure brought to bear upon the sheet by the grinding head, and as the weight of the grinding head becomes less after use, the time required for surfacing is lengthened.

It is an object of the present invention to provide an apparatus that will take care of this wear so that the same amount of weight or pressure can be applied after the grinding head has become worn as at the beginning. It is also possible with this construction to have a greater pressure even at the beginning of the operation than the weight of the head alone which has been the limit heretofore.

The numeral 5 designates a sheet supporting table rotatably supported upon a shaft 6, the shaft 6 carrying a ring gear 7 which meshes with a drive pinion 8 deriving power through the shaft 9. A suitable frame-work 10 supports bearing elements 11 so that the table may be rotated as freely as possible. In the machine shown, the sheet of glass 12 is supported within the recess 13 in a manner that the sheet 12 is permitted to freely move within the recess during the grinding operation. A protective pad 14 is interposed between the bottom of the recess and the sheet of glass, so that the surface of the sheet will not be marred when the sheet moves around within the said recess. Adjustable side plates 15 are mounted upon the table to control the size of the recess within which the sheet is supported.

A grinding head 16 is adapted to be arranged above the table 5, and is preferably formed from cast iron, although any other suitable metal may be used. The head may carry a plurality of depending lugs or blocks 17, the bottom surfaces of which contact with the sheet during the surfacing operation. The numeral 18 designates a discharge spout of an abrasive supplying system whereby the abrasive 19 is continuously spread upon the sheet of glass being surfaced so that a film of abrasive will be disposed between the bottom of the blocks 17 and the surface of the sheet being ground.

The head 16 has clamped thereon a bearing raceway 20 to which is keyed a vertical shaft 21 by means of the pin 22. A long sleeve 23 is arranged around the shaft 21 and has formed therein a rack bar 24 engageable with a segmental rack 25 pivoted upon the stub shaft 26. A link construction 27 is connected to the segmental rack 25 and a pulley 28.

Arranged between the lower end of the sleeve 23 and the bearing raceway 20 are a plurality of roller bearings 29 so that the grinding head and shaft can rotate freely within the sleeve bearing 23. Carried at the top of the sleeve bearing 23 is a suitable coupling 30 which is screw-threadedly mounted upon the end of the sleeve bearing 23, and is also screw-threadedly connected to a plunger 31. Arranged between the end of the plunger and within the coupling 30 is a bearing arrangement 32 on the end of the shaft 21, so that the grinding head can be moved in a vertical position, the weight of the head being carried by the bearings 32 when the head is moved upwardly, while any pressure exerted on the plunger 31 is transmitted through the bearings 29.

A cylinder 33 is arranged around the plunger 31, being supported by the braces 34. Pipe system 35 is connected to the end of the cylinder 33, so that water or air 36 can be introduced within the cylinder under pressure, the pressure being exerted on the end of the piston 31. Valve 37 is used to control the amount of pressure exerted on the end of the piston 31, while the gage 38 is used to show the amount of pressure being used. A relief valve 39 having connection with the cylinder 33 by means of the pipe 40 is used to relieve pressure within the cylinder. The valves 37 and 39, as well as the gage 38, are preferably located in a place that the operator of the machine can have easy access thereto so that an accurate control of the pressure exerted upon the end of the piston 31 can be had. With this construction the desired amount of pressure can be exerted through the piston 31, coupling 30 and sleeve bearing 23, and head 16.

Arranged around the grinding table and head 16 is a cage 41 carried by the cables 42, operable over the pulleys 43. By a suitable cable and pulley arrangement, the grinding head and cage 41 balance each other, and as the grinding head is moved up, the cage 41 will be moved down to give access to the grinding table. As the grinding head is moved into operative position upon the sheet, the cage 41 is moved up for protective purposes, and to also prevent the abrasive from flying off the table onto the floor. The abrasive, after it has been used, is carried around the bottom edge 45 of the cage 40 and caught within the gutter 46 where it is transferred to a sewer 44. This abrasive thus caught may either be removed as waste or returned back to the abrasive system where it can be regraded and reused.

With this hydraulic system, any amount of pressure can be brought to bear upon the grinding head, thus increasing or reducing the speed of surfacing of the sheet of glass. Ordinarily, as the blocks 17 on the head 16 wear off, the amount of pressure will be increased, although other factors may enter such as the size of sheet, thickness of sheet, and type of glass.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass surfacing apparatus, means for supporting a sheet to be surfaced, a rotatable surfacing member adapted to rest upon the sheet, a vertical shaft connected at its lower end to the surfacing member, a non-rotatable sleeve surrounding said shaft and carried by said member, a plunger connected to said sleeve and arranged in substantially vertical alignment with said shaft, and a cylinder for snugly receiving the plunger therein, said cylinder having an inlet and an outlet therein by which fluid pressure can be admitted thereto and released therefrom, the inlet and outlet being so positioned that the fluid pressure will act directly upon the upper end of the plunger.

2. In sheet glass surfacing apparatus, means for supporting a sheet to be surfaced, a rotatable surfacing member adapted to rest upon the sheet, a vertical shaft connected at its lower end to the surfacing member, a non-rotatable sleeve surrounding said shaft and carried by said member, a coupling carried at the upper end of said sleeve, a plunger connected to said coupling in substantially vertical alignment with said shaft, and a vertically elongated cylinder for snugly receiving the plunger therein, said cylinder having an inlet and an outlet therein above said plunger by which fluid pressure can be admitted thereto and released therefrom.

Signed at Toledo, in the county of Lucas, and State of Ohio, this 29th day of June, 1925.

JOHN C. GIPE.